United States Patent [19]

Chu et al.

[11] Patent Number: 5,001,096

[45] Date of Patent: Mar. 19, 1991

[54] METAL PASSIVATING AGENTS

[75] Inventors: Pochen Chu, West Deptford, N.J.; Albin Huss, Jr., Chadds Ford, Pa.; Garry W. Kirker, Sewell, N.J.

[73] Assignee: Mobil Oil Corporation, Fairfax, Va.

[21] Appl. No.: 335,068

[22] Filed: Apr. 7, 1989

Related U.S. Application Data

[63] Continuation-in-part of Ser. No. 138,002, Dec. 28, 1987, abandoned.

[51] Int. Cl.$^5$ .......................... B01J 29/04; B01J 35/02
[52] U.S. Cl. ...................................... 502/65; 502/516; 502/521; 502/527
[58] Field of Search ................... 502/65, 516, 521, 527

[56] References Cited

U.S. PATENT DOCUMENTS

| | | | |
|---|---|---|---|
| 4,222,856 | 9/1980 | Hansel et al. | 208/120 |
| 4,289,608 | 9/1981 | McArthur | 502/521 |
| 4,781,816 | 11/1988 | Lee et al. | 502/516 |

FOREIGN PATENT DOCUMENTS 1053737  1/1967  United Kingdom ................ 502/516

*Primary Examiner*—Carl F. Dees
*Attorney, Agent, or Firm*—Alexander J. McKillop; Charles J. Speciale; Richard D. Stone

[57] ABSTRACT

The invention describes the preparation of novel cracking catalysts by surface coating conventional cracking catalysts with passivators that act as metals traps. The coating of passivators is weakly bound to the catalyst so as to permit the coating to continuously attrit off during catalytic cracking. The continuous flaking off of the coating exposes a new surface of the coating.

31 Claims, 4 Drawing Sheets

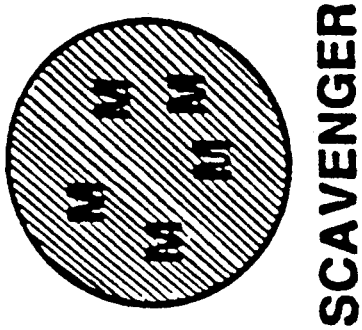
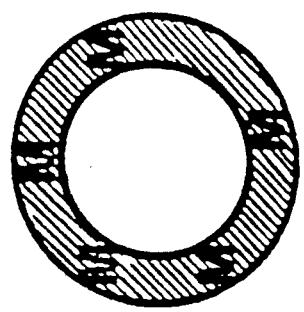
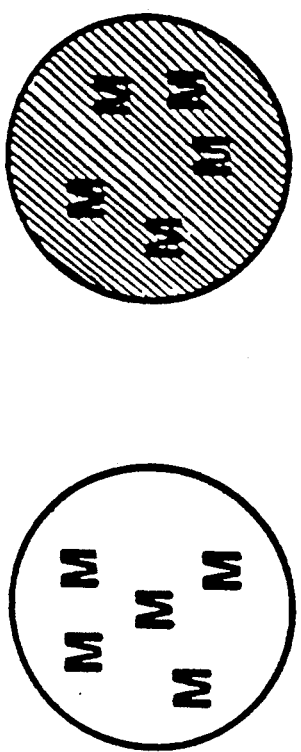
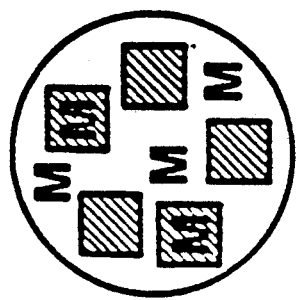
FIG.1 CATALYST TYPES FOR SCAVENGING METALS
FCC CATALYST
SCAVENGER
SCAVENGER COATED FCC CATALYST
FCC CATALYST CONTAINING SCAVENGER(S)

METAL PASSIVATING AGENTS

This application is a continuation-in-part of parent application Ser. No. 07/138,002 filed Dec. 28, 1987, now abandoned. The text of Ser. No. 07/138/002 is incorporated into the present application by reference.

FIELD OF INVENTION

A cracking catalyst is surface coated with a solid, refractory material that can interact and trap metal components in the feedstocks. These metals, which include nickel, iron, copper, sodium and vanadium, destructively interact with the catalyst and/or adversely affect the cracking catalyst performance. The coating material is weakly bound to the catalyst, and attrits off during the cracking process so as to expose new sites continuously.

BACKGROUND OF THE INVENTION

The use of zeolite-containing cracking catalysts has been described. The invention pertains to improvements in such zeolitic cracking catalyst to accommodate problems which inhere in current refinery trends.

Current worldwide refinery trends indicate a continuing need to process heavier feedstocks. As a result, many refiners are processing feeds containing atmospheric and/or vacuum resid fractions with high metals content. The development of a highly metals resistant cracking catalyst such as herein disclosed would reduce cracking catalyst requirements; permit the processing of heavier feeds including resids and give the refiner greater overall flexibility in unit operating conditions. The problem of metal contaminated feeds is treated in U.S. Pat. Nos. 4,158,621 and 4,645,589.

The magnitude of the problem of cracking metals-laden feeds for FCC is known. Indeed, it is evident that activity losses due to vanadium poisoning are due to destructive interaction of vanadium species and the active zeolite. Therefore, an effective trap for vanadium may be expected to significantly increase the life of FCC catalysts when processing heavier feeds. FCC catalyst requirements as high as 0.5–1.0 lbs. per barrel of FCC feed are typical when processing resids compared with 0.1–0.2 lb. of catalyst per barrel for conventional gas oils. This dramatic increase in catalyst usage is largely due to the higher metals content of the heavier resid feeds. The deleterious effects of metals have been discussed extensively in the literature (U.S. Pat. Nos. 4,376,696; 4,513,093; 4,515,900) and are also well known to those skilled in the art. Vanadium is known to substantially deactivate cracking catalysts by irreversibly destroying the active zeolite while nickel, iron and copper promote dehydrogenation reactions which result in increased coke and dry gas yields at the expense of the desired liquid products. On the other hand, sodium reduces catalyst activity by neutralizing acid sites.

SUMMARY OF THE INVENTION

The concept disclosed is that of preparing novel cracking catalysts by surface coating conventional cracking catalysts with passivators that act as metal traps. This concept is in contrast to the other types of metals scavenging catalysts, namely the separate particle additive which contains the metals traps and active catalyst components in separate particles and the composite catalyst which contains the metals traps throughout the catalyst particle as illustrated in FIG. 1.

A cracking catalyst resistant to metals poisoning, expecially by nickel and vanadium, is obtained when a protective coating that acts as a trap for metals is applied to the surface of the catalyst prior to exposure to metals-containing feedstocks. This protective coating, which can be strongly bound to the catalyst and acts as a passivator of the metals, can remain protective for the useful life of the catalyst.

Alternatively, the protective coating that serves the same metals removal and passivation function can be weakly bound so as to gradually flake off the catalyst, and in so doing, the spent coating material serves as a sacrificial metals trap which continually exposes new sites as the coating attrits off. This could be a very effective method of removing nickel from an FCC catalyst and, as a result, maintaining a low overall metals level in the FCC unit inventory.

Either fluid or moving bed cracking catalysts can be rendered resistant to metals poisoning by the method of this invention.

DESCRIPTION OF THE DRAWINGS

FIG. 1 is an illustration of various embodiments of incorporation of scavengers into catalysts.

DETAILED DESCRIPTION

Figure 2A:
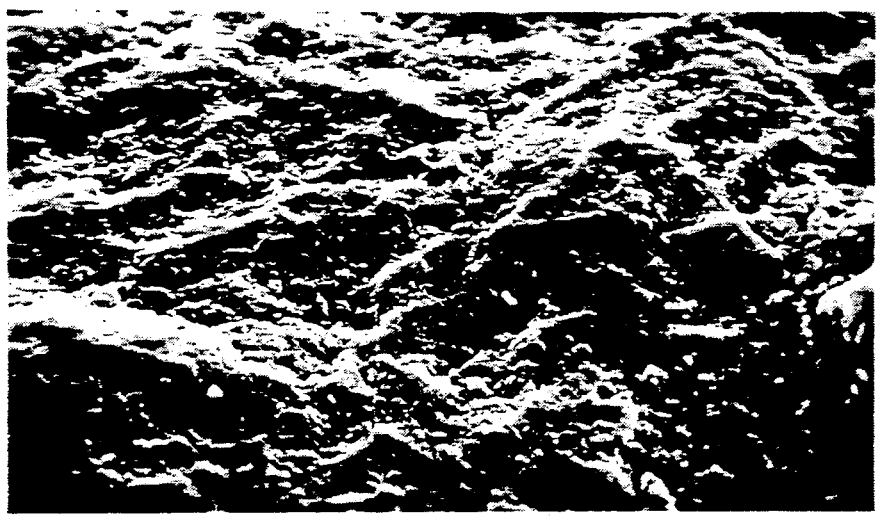
FIG. 2 shows a comparison of the scanning electron micrographs of the uncoated base catalyst of Example 1 and the lanthana-alumina-aluminum phosphate (LAAP) coated catalyst of Example 6.

The metals passivating component of the present invention is weakly applied as a surface coating to the conventional cracking catalysts by, for example, the spray coating techniques of Examples 6–9 of this specification. This procedure is distinct from procedures such as impregnation in that the passivating component is applied to the catalyst as a surface coating.

The metal passivators do not penetrate the catalyst particle to any substantial degree, and the surface coating is weakly bound to the substrate cracking catalyst particle. As a result, the coating gradually flakes off the catalyst, and serves as a sacrificial metals trap.

The continuous exposure of fresh coating surface leads to the catalyst system of the present invention providing an effective method not only of passivating the deleterious effects of metal contaminants, but also of maintaining a low overall metals level in the cracking catalyst inventory.

In the specific case of fluid catalystic cracking (FCC), the binding strength of the surface coating to the cracking catalyst particle can be characterized using the standard fluid catalyst attrition test as described in the section of the present specification entitled "Attrition Analysis Of Coated Catalysts", which appears between Examples 9 and 10. This test is typically used to determine the strength or attrition resistance of a fluid catalyst particle. In the case of the passivator coated catalyst, this test can also be used to determine the strength of the surface coating. In order to do so, the "Coating Attrition Index (CAI)" is defined as the weight percent of the original coating which attrits off during the standard one hour test period. For the catalysts of the present invention, the "CAI" is at least 0 1, preferably at least 0.5 and most preferably at least 1.0. The maximum CAI of the catalyst of the present invention is 100, preferably 75 and most preferably 50.

Catalytic cracking units which are amenable to the process of this invention operate within the temperature range of about 400° F. (205° C.) to 1600° F. (871° C.), and under reduced, atmospheric or superatmospheric pressure The catalytic cracking process can be either fixed bed, moving bed or fluidized bed, and the hydrocarbon charge stock flow may be either concurrent or countercurrent to the conventional catalyst flow. The process of this invention is particularly applicable to the fluid catalytic cracking (FCC) process.

The FCC process is well known to the art and detailed description thereof is not believed necessary. Although the design and construction of individual plants vary, the essential elements of an FCC unit are illustrated in U.S. Pat. No. 4,368,114, which is incorporated herein by reference.

Briefly, in the FCC process the catalyst is in the form of microspheres, which acts as a fluid when suspended in oil vapor or gas. The hydrocarbons contact the fluidized catalyst and are catalytically cracked to lighter products. The catalyst is deactivated by coke deposition, necessitating regeneration of coked catalyst in a regenerator.

After cracking, the resulting product gas can be compressed and the resulting products may suitably be separated from the remaining components by conventional means, such as adsorption, distillation, etc. The cracking catalysts used in conjunction with the passivating agents of the present invention comprise large pore crystalline molecular sieves, which typically are zeolites. The large pore crystalline molecular sieve may comprise the active component of the catalyst in a suitable matrix.

Some representative large pore crystalline molecular sieves used as catalysts in accordance with the invention include zeolite X, zeolite Y, dealuminated Y zeolite, e.g., USY, dealuminated silicon enriched zeolites, e.g., LZ-210, as well as zeolite ZK-5, and zeolite L, as well as naturally occurring zeolites such as faujasite, mordenite and the like. Other large pore zeolites include zeolite beta, L, omega, mordenite and ZSM-20.

Some additional crystalline molecular sieves include pillared silicates and/or clays, pillared layered materials and aluminophosphates, e.g., ALPO-5, VPI-5; silicophosphates, e.g., SAPO-5, -31, -37, -40, -41; and other metal aluminophosphates also known as MEAPOs. These are variously described in U.S. Pat. Nos. 4,440,871; 4,554,143; 4,567,029; 4,666,875; and 4,742,033. Admixtures of large pore crystalline molecular sieves may also be used.

The large pore crystalline molecular sieves are ordinarily ion exchanged either separately or in the final catalyst with a desired cation to replace alkali metal present in the molecular sieves as found naturally or as synthetically prepared The exchange treatment is such as to reduce the alkali metal content of the final catalyst to less than about 1.5 wt. % and preferably less than about 0.5 wt. %. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth metal ions and mixtures thereof, with particular preference being accorded rare earth metal ions. Such rare earth metal ions include Sm, Nd, Pr, Ce and La. Ion exchange is suitably accomplished by conventional contact of the molecular sieves with a suitable salt solution of the desired cation such as, for example, the sulfate, chloride or nitrate.

The large pore crystalline molecular sieves of the cracking catalyst are typically incorporated in a suitable inorganic oxide matrix because this catalyst form is generally characterized by a high resistance to attrition, high activity and exceptional steam stability. The inorganic oxide which serves as the matrix in which the above molecular sieves are distributed includes silica gel or a cogel of silica and suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 wt. %, preferably 60 to 95 wt. %, and the other metal oxide or oxides will generally be within the range of 0 to 45 wt. % and preferably 5 to 40 wt. %. In addition to the above, the matrix may also comprise natural or synthetic clays, such as kaoline type clays, montmorillonite, bentonite or halloysite. These clays may be used either alone or in combination with silica or any of the above specified cogels in matrix formulation. Such clays can be used in the raw state as originally mined or initially subjected to calcination, acid treatment or chemical modification. In addition to the foregoing materials, they can be composited with a porous matrix material such as a silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-alumina-zirconia. The matrix can be in the form of a cogel.

The content of large pore molecular sieves in the bound catalyst is generally between 5 and about 60 wt. %. Ion exchange of the large pore molecular sieves to replace its initial alkali metal content can be accomplished either prior to or subsequent to incorporation of the porous crystalline silicate into the matrix.

The above compositions may be readily processed so as to provide fluid cracking catalyst by spray drying the composite to form microspheroidal particles of suitable size. Alternatively, the composition may be adjusted to suitable concentration and temperature to form bead type catalyst particles suitable for use in moving bed type cracking systems. Spheres or microspheres containing large pore molecular sieves have been used in catalytic cracking The particle size of these spheres may be sufficient to pass through a 2 mesh (8mm) (Tyler) screen and be retained on a 400 mesh (37μ) (Tyler) screen. The spheres may be in the form of a powder, a granule or a molded product (such as an extrudate). As used herein the words spheres and microspheres include beads. The catalyst may also be used in various other forms such as those obtained by tabletting, balling or extruding.

Hydrocarbon charge stocks undergoing cracking in accordance with this invention comprise hydrocarbons generally and, in particular, petroleum fractions having an initial boiling range of at least 400° F. (205° C.), a 50% point of at least 500° F. (260° C.), and an end point of at least 600° F. (315° C.). Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 750° F. (400° C.) must be carried out under vacuum in order to avoid thermal cracking. The boiling temperatures utilized herein are expressed, for convenience, in terms of the boiling point corrected to atmospheric pressure In accordance with the invention, the catalyst microspheres or beads are provided with a solid, porous coating comprising a metals passivating or metals-trapping component. Suitable materials for application as surface coatings would include, but are not limited to: oxides of the lanthanide and actinide series, the oxides of Group IIA, IIIA, IVA, IIIB, Si, Ge, Sn, Pb, P, Sb, Bi and Te. Combinations of elements from two or three groups may also be used.

In accordance with one embodiment of the invention the catalyst microspheres are provided with a solid, porous, coating comprising rare earth oxide-aluminum oxide-aluminum phosphate, such as lanthana-alumina-aluminum phosphate, or mixed rare earth oxide-aluminum oxide-aluminum phosphate. In this embodiment of the invention, the coating is an X-ray amorphous solid, porous refractory coating. The rare earth metals include those with atomic number of 57 through 72, e.g., La, Ce, Pr, Nd, Sm, Eu, Gd, Tb, Dy, Ho, Er, Tm, Yb, Lu, Hf and mixtures thereof such as lanthanum and cerium. The coating composition is synthesized by neutralizing a solution of rare earth metal or metals and aluminum in phosphoric acid with a basic solution The presence of organic base, e.g., tetraalkylammonium or alkylamine, compounds in the synthesis reaction mixture results in a controlled modification of the pore size distribution of the final product composition.

One such coating is applied to the microspheres and then dried. In a preferred embodiment, application is by spraying as described in the Examples. The coating is dried at temperatures above 100° C.

The amount of coating on the particles is that amount that is sufficient to significantly passivate metal contaminants from the feedstock. Following coating and drying, for example, the REOAAP may constitute about 0.1 to 50% by weight, preferably about 0.5 to 25% by weight, more preferably 1.0 to 10.0% by weight of the particles.

The coating is prepared forming a first solution containing at least one source of aluminum (+3 valence), a source of rare earth metal (+3 valence) and phosphoric acid and providing a second solution comprising a basic solution; and the mixing the first and second solutions together with agitation, e.g., stirring, while maintaining the mixture pH at from about 8 to about 12, preferably from about 8.5 to about 9.5.

Examples of suitable sources of aluminum for the first solution include aluminum nitrate and aluminum sulfate. The first solution will also comprise one or more sources of rare earth metal ($RE^{+3}$), including as suitable examples, lanthanum nitrate, lanthanum chloride and mixed rare earths such as rare earth chlorides. Commercial sources of rare earths often comprise mixtures of salts of such metals, e.g., the chlorides. These aluminum and rare earth metal sources are dissolved in a suitable polar solvent medium, such as water. The first solution will also comprise phosphoric acid ($H_3PO_4$), e.g., in solution with water. The composition of this first solution will be comprised as follows:

| COMPONENT | WT % OF SOLUTION |
| --- | --- |
| Aluminum | 0.1 to 10 |
| Rare Earth metal | 0.1 to 10 |
| Phosphorus | 0.2 to 5 |

The second solution will comprise a basic solution (pH of from about 10 to about 14). Suitable components of this second solution include inorganic and/or organic bases such as, for example, ammonium hydroxide, ammonia, tetraalkylammonium hydroxide and alkylamine, alkyl being methyl-, ethyl-, propyl-, butyl- or a mixture thereof, e.g., tetramethylammonium and n-propylamine.

It is believed that the exact composition of the second solution, i.e., the type and concentration of organic or inorganic base, affects the pore size distribution in the final synthesis product. For instance, the use of tetramethylammonium hydroxide in the second solution, as exemplified hereinafter, results in an increased percentage of pores in the 100–200 Angstrom diameter range when compared to use of a basic second solution having no tetramethylammonium.

In general, the calcined amorphous refractory composition hereof will have a surface area of from about $50m^2/g$ to about $500m^2/g$, preferably from about $100m^2/g$ to about $250m^2/g$; and a pore volume of from about 0.3cc/g to about 1.5cc/g, preferably from about 0.5cc/g to about 1cc/g.

The pore size distribution of the present material following calcination will include about 5 vol. % to about 20 vol. % within the pore size diameter range of 50 to 100 Angstroms, about 10 vol. % to about 35 vol. % within the pore size diameter range of 100 to 150 Angstroms, about 15 vol. % to about 50 vol. % within the pore size diameter range of 150 to 200 Angstroms and about 10 vol. % to about 50 vol. % within the pore size diameter range of 200 to 400 Angstroms.

A further distinguishing feature of the present refractory composition is its ability to sorb vapor molecules of water, cyclohexane and n-hexane in an Equilibrium Sorption Test, hereinafter detailed, following calcination at 538° C for 6 hours, of greater than about 10 wt. % water, greater than about 6 wt. % cyclohexane and greater than about 5 wt. % n-hexane.

The relative proportions of components of the present amorphous refractory composition in terms of rare earth oxide:aluminum oxide:aluminum phosphate (weight relationships) will be from about 10:20:70 to about 90:5:5, especially from about 25:20:55 to about 30:25:45.

The coating composition can be dehydrated by heating to a temperature in the range of 200° C to 595° C in an inert atmosphere, such as air, nitrogen, etc., and at atmospheric, subatmospheric or superatmospheric pressures for between 15 minutes and 48 hours. Dehydration can also be performed at room temperature merely by placing the material in a vacuum, but a longer time is required to obtain a sufficient amount of dehydration.

The refractory coating may be beneficially thermally treated prior to use in a chemical conversion process by heating at a temperature of at least 370° C. for at least 1 minute and generally not longer than 20 hours. While subatmospheric pressure can be employed for the thermal treatment, use of atmospheric pressure is desired for reasons of convenience. The thermal treatment can be performed at a temperature up to about 925° C.

Calcination of the rare earth oxide-aluminum oxide-aluminum phosphate material used to coat the catalysts in accordance with the invention produces a product characterized by a surface area from about 50 m$^2$/g to about 500 m$^2$/g, a pore volume of from about 0.3 cc/g to about 1.5 cc/g, and Equilibrium Sorption capacities of greater than about 10 wt. % for the water vapor, greater than about 6 wt. % for cyclohexane vapor and greater than about 5 wt. % for n-hexane vapor.

EXAMPLES

Example 1

The catalyst of Example 1 was a commercial REY catalyst manufactured by the Davison Division of W.R. Grace. This catalyst was chemically analyzed and found to contain (100% solids basis) 63.7 wt. % SiO$_2$, 32.2 wt. % Al$_1$O$_3$, 3.0 wt. % RE$_2$O$_3$ and 0.57 wt. % Na. X-ray analysis indicates an REY content of about 14%. The surface area of the as-received catalyst was 151 m$^2$/g.

Example 2

The catalyst of this example was laboratory prepared and contains 20 wt. % calcined REY in a SiO$_2$-Al$_2$O$_3$-clay (60.45/4.55/35 wt/wt/wt) matrix.

As detailed in Examples 3–5 below, separate gels of Lanthana-Alumina-Aluminum Phosphate (LAAP), Magnesia-Alumina-Aluminum Phosphate (MAAP) and Tin (IV) Oxide (SnO$_2$) were prepared for surface coating of FCC catalysts. These materials were selected because they contain one or more of the vanadium passivators La, Mg, P and Sn. While subsequent work showed poor vanadium resistance for the MAAP and SnO$_2$ coated catalysts, the examples are nonetheless included to demonstrate the surface coating concept. These results indicated that the MAAP and SnO$_2$ compositions were not effective as metals traps. In contrast, the LAAP coating does significantly improve the vanadium tolerance of the base catalyst as detailed herein.

Example 3

Lanthana-Alumina-Aluminum Phosphate (LAAP) Gel Preparation

Reagent Grade Al(NO$_3$)$_3$.9H$_2$O (26 parts) was dissolved into 68 parts of distilled water. These solutions were combined and H$_3$PO$_4$ (4 parts) was added and the resulting clear solution was well stirred. A separate solution consisting of 97 parts of 25 wt. % TMAOH was placed on a dropping funnel. These two solutions were next simultaneously added to a beaker which contained 68 parts of distilled water and the contents were continually stirred during the mixing period. The relative addition rates of the two solutions were adjusted to maintain the pH of the suspension at 9.0. The final pH of the suspension containing the while precipitate was 9.11. The suspension was filtered, washed with 1 liter of distilled water and held as a wetcake. The gel (at 6.9 wt. % solids) was homogenized in an Oster blender for 3 minutes.

Example 4

Magnesia-Alumina-Aluminum Phosphate (MAAP) Gel Preparation

Reagent grade Al(NO$_3$)$_3$.9H$_2$O (12.5 parts) was dissolved in 33.3 parts of distilled water. Separately, Mg(NO$_3$)$_2$.6H$_2$O (0.9 parts) was dissolved in 33.3 parts of distilled water. These solutions were combined and 2.0 parts of (85.8 wt. %) H$_3$PO$_4$ was added with stirring. In a separate vessel, n-propylamine (9.9 parts) was added to 8.0 parts of distilled water and thoroughly mixed. These two solutions were slowly added to a stirred solution of 33.3 parts of distilled water at rates which maintained a constant pH of 9.0. After all of the solution was added, a final pH of 9.0 was recorded. The gel was 2.4 wt. % solids.

Example 5

Tin (IV) Oxide Gel Preparation

Reagent grade SnCl$_4$.5H$_2$O (9.2 parts) was dissolved in 52.5 parts of distilled water. Next, slowly and with vigorous stirring, TMAOH (38.3 parts) was added to reach a pH of 5.0. The gel was stirred for 15 minutes, then filtered washed with 3 3 L of distilled water and pulled to a wet filter cake. The wet cake was then suspended and homogenized in water. The gel was determined to be 3.0 wt. % solids at 1000° F.

Examples 6–9

Spray Coating of Fluid Catalysts

Example 6

Using a Yamato Model GA-21 Fluidized Bed Spray Granulator Dryer, the gel of Example 3 was sprayed into a heated (200° C.) fluidized bed of the catalyst of Example 1 so as to apply a surface coating of LAAP on the fluid microspheres. Chemical analysis of a calcined portion of this material indicate the following composition: 55.4 wt. % SiO$_2$, 3.75 wt. % RE$_2$O$_3$ (2.5 wt. % as La$_2$O$_3$) and 0.29 wt. % P at an ash content of 96.1 wt. %. The calculated LAAP content is approximately 2.5 wt. % based on P analysis.

Example 7

Using the same procedure as described in Example 6 above, the MAAP gel of Example 4 was sprayed onto the catalyst of Example 2 so as to apply a surface coating of MAAP. Chemical analysis of a calcined portion of this material indicate the following composition: 66.3 wt. % SiO$_2$, 0.45 wt. % P and 0.14 wt. % Mg at an ash content of 95.2 wt. %. The calculated MAAP content is 3.7 wt. % based on P analysis.

Example 8

The catalyst of this example was prepared identically to that of Example 7 except that the fluidized bed spray dryer conditions were altered. Chemical analysis of a calcined portion of this material indicate the following composition: 69.5 wt. % SiO$_2$, 0.44 wt. % P and 0.115 wt. % Mg at an ash content of 94.9 wt. %. The calculated MAAP content is 3.6 wt. % based on P analysis.

Example 9

Using the same procedure as described in Example 6 above, the SnO$_2$ gel of Example 5 was sprayed onto the fluid catalyst of Example 2 so as to apply a surface coating of SnO$_2$. Chemical analysis of a calcined portion of this material indicate the following composition: 71.0 wt. % SiO$_2$ and 2.6 wt. % Sn at an ash content of 96.4 wt. %. The calculated SnO$_2$ content is 3.4 wt. % based on the Sn analysis.

Characterization of Examples 1–9 Catalysts

Several types of analyses were performed which demonstrate that the method employed in Examples 6–9 resulted in a surface coating of the fluid catalyst microspheres with the desired gels. This method did not result in either appreciable surface penetration of the fluid catalyst or formation of individual fluid microspheres of the LAAP, MAAP, or $SnO_2$ gels. The evidence which is detailed below is based on Scanning Electron Microscopy (SEM), Surface X-ray Photoelectron Spectroscopy (XPS) and chemical analysis of fines attrited from the coated catalysts.

Scanning Electron Microscopy

Figure 2B:
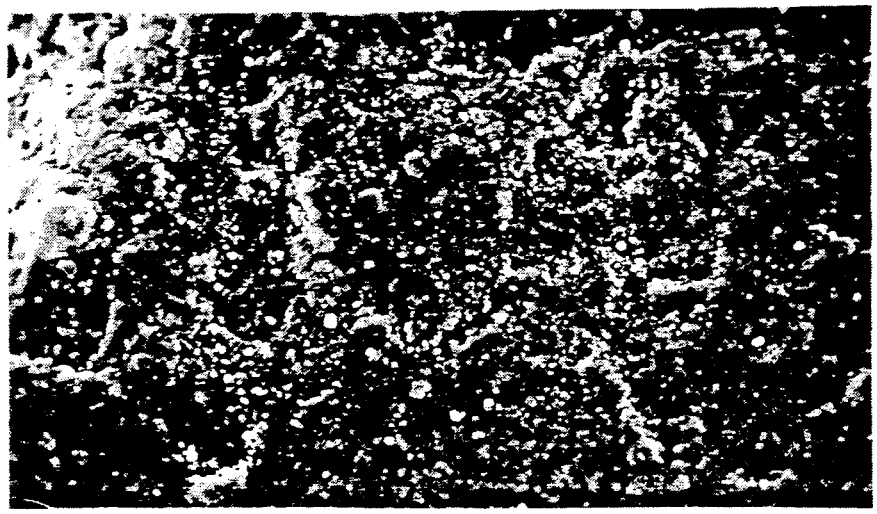

A comparison of the scanning electron micrographs of the uncoated base catalyst of Example 1 and the LAAP coated catalyst of Example 6 is shown in FIG. 2.

Figure 3A:
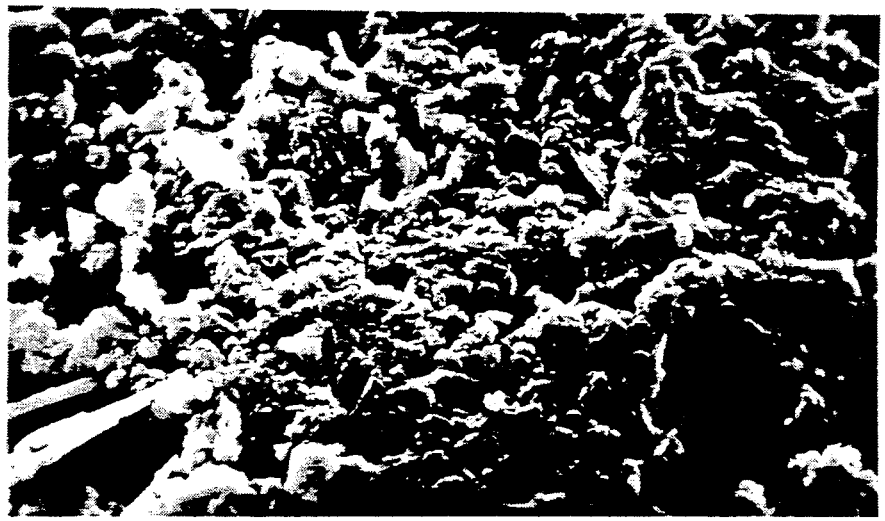
FIGS. 3 and 4 compare the uncoated base catalyst of Example 1 with the magnesia-alumina-aluminum phosphate (MAAP) and $SnO_2$ coated catalysts of Examples 8 and 9, respectively.
Figure 3B:
Figure 4:
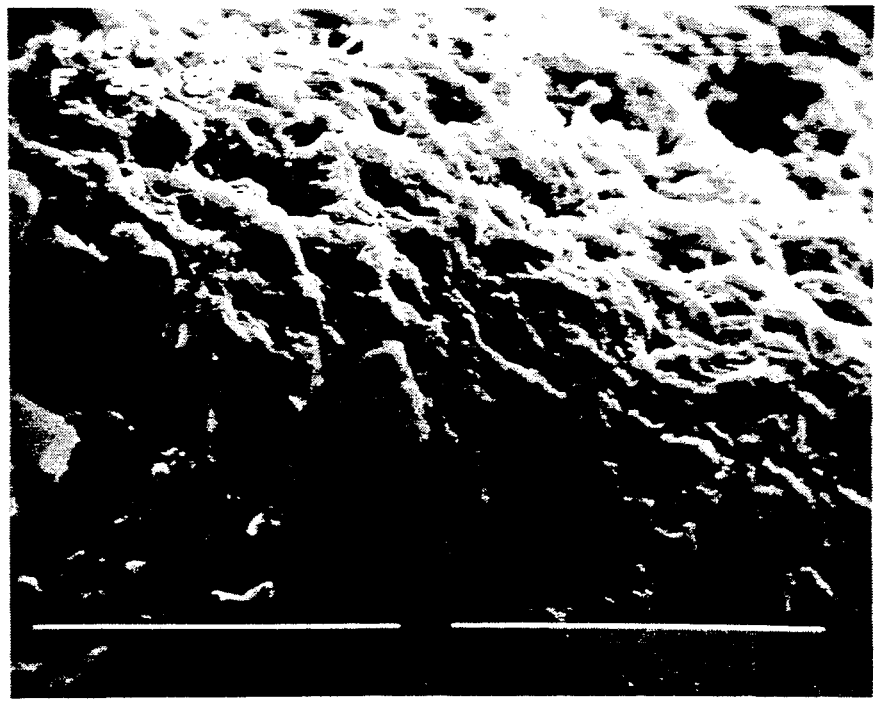

FIGS. 3 and 4 compare the uncoated base catalyst of Example 2 with the MAAP and $SnO_2$ coated catalysts of Examples 8 and 9, respectively. In each case, a substantial change in the surface morphology of the fluid microspheres is observed due to the spray coating procedure.

Surface X-ray Photoelectron Spectroscopy

XPS analyses of the commercial REY base catalyst of Example 1 indicated a surface La content of 2.2 wt. % as compared with 1.6 wt. % bulk. For the LAAP coated catalyst of Example 6, the surface La content increased to 18.8 wt. % while the bulk value increased to only 2.6 wt. %. Si is still observed on the LAAP coated particle surface, indicating that while the LAAP is predominately on the surface it does not completely cover all the available surface.

Attrition analysis of Coated Catalysts

The catalysts of Examples 6–9 were each evaluated in our standard FCC catalyst attrition test using the following procedure: 7.0 cc of calcined (1000° F., 2 hrs.) catalyst is contacted in a 1 inch i.d., "U" tube with an air jet formed by passing humidified (60%) air through a 0.07 inch nozzle at 21 liters/min for 1 hour. The fines (0–20μ) generated during attrition are removed as formed in the Roller apparatus and collected in a paper thimble. The particles which are approximately 20μ and larger are retained in the "U" tube. The attrition index (AI) is defined as the increase in the fines fraction (0–20μ) caused by the attrition process.

Due to the nature of the surface coating, one might expect the LAAP, MAAP and $SnO_2$ coatings to be relatively weakly bound to the fluid particles compared with the strength of the base FCC catalyst microspheres. This would result in a preferential attriting of the surface coating and a resulting concentration of LAAP, MAAP or $SnO_2$ in the thimble fines product. This is exactly what was observed as shown in Table 1.

TABLE 1

| Attrition of Surface Coated FCC Catalysts | | | | |
| --- | --- | --- | --- | --- |
| Example Number | 6 | 7 | 8 | 9 |
| Passivating Coating | LAAP | MAAP | MAAP | $SnO_2$ |
| Wt. Percent Coating | 2.5 | 3.7 | 3.6 | 3.4 |
| Thimble Fines (Attrited Product) | | | | |
| Wt. Percent of Catalyst Charged | 5.3 | 10.1 | 13.6 | 9.7 |
| Wt. Percent Passivator Coating "U" Tube Product | 42 | 26 | 21 | 22 |
| Wt. Percent Passivator Coating | 1.3 | 1.0 | 2.0 | 1.0 |
| Remaining Percent of Initial Coating Retained | 52 | 28 | 54 | 25 |

The foregoing results in Table 1 illustrate the rather weak bonding of the surface coating which flakes off the catalyst during usage. In so doing, the spent surface coating serves as a sacrificial metals trap. As it flakes off, it both removes trapped metals from the cracking unit and exposes new passivation and/or catalytic sites.

Example 10

A portion of the commercial REY base catalyst described in Example 1 was steamed to 1450° F. for 10 hours in a 45% steam/55% air, 0 psig atmosphere. The resulting catalyst had a surface area of 94 $m^2/g$ and was analyzed by X-ray to contain 11.3% REY with a corresponding unit cell lattice parameter of 24.56 A°.

Example 11

A portion of the LAAP coated catalyst described in Example 6 was steamed at the conditions specified in Example 10. The resulting catalyst had a surface area of 101 $m^2/g$ and was analyzed by X-ray diffraction to contain 12.3% REY with a corresponding unit cell lattice parameter of 24.56A°.

Example 12

A portion of the commercial REY base catalyst of Example 1 was blended with an amount of $V_2O_5$ powder such that the overall vanadium content was 0.5 wt. % in the mixture. This mixture was then steamed at the conditions as specified in Example 10. The resulting catalyst contained only 1.9 wt. % REY based on X-ray diffraction Chemical analyses indicates a vanadium content of 0.52 wt. %.

Example 13

A portion of the LAAP coated catalyst of Example 3 was blended with an amount of $V_2O_5$ powder such that the overall vanadium content was 0.50 wt. % in the mixture. This mixture was then steamed at the conditions as specified in Example 10. The resulting catalyst contained 2.7% REY based on X-ray diffraction Chemical analysis indicates a vanadium content of 0.53 wt. %.

Evaluation of Base and LAAP Coated Catalysts

To demonstrate the effect of the LAAP coating on the vanadium tolerance of the base FCC catalyst, the catalysts of Examples 10–13 were each catalytically evaluated in a fixed-fluidized bed unit at 960° F. temperature, 3.0 cat/oil (15 WHSV) and 1.0 minutes on-stream using a Heavy Gas Oil as feed. The chargestock properties are given in Table 2. The catalytic results, summarized in Table 3, clearly demonstrate a greater vanadium tolerance for the LAAP coated catalyst. Following the addition of 5000 ppm V (as $V_2O_5$) and subsequent hydrothermal treatment, the LAAP-coated catalyst of Example 13 gave a 37.0 vol. % conversion of the heavy gas oil feed compared to only 30.8 vol. % conversion for the uncoated base catalyst of Example 12.

TABLE 2

| Chargestock | Heavy Gas Oil (HGO) |
| --- | --- |
| Gravity, API | 24.3 |

TABLE 2-continued

| Chargestock | Heavy Gas Oil (HGO) |
|---|---|
| Aniline Pt., °F. | 171 |
| Hydrogen, wt. % | 12.3 |
| Sulfur, wt. % | 1.87 |
| Nitrogen, wt. % | 0.10 |
| Basic Nitrogen, ppm | 327 |
| Conradson Carbon, wt. % | 0.28 |
| Kinematic Viscosity at 210° F. | 3.6 |
| Bromine No. | 4.2 |
| R.I. at 70° F. | 1.5080 |
| Molecular Weight | 358 |
| Pour Point, °F. | 85 |
| Paraffins, wt. % | 23.5 |
| Naphthenes, wt. % | 32.0 |
| Aromatics, wt. % | 44.5 |
| Aromatic Carbon, wt. % | 18.9 |
| Ni, ppm | 0.3 |
| V, ppm | 0.6 |

TABLE 3

Effect of LAAP On Vanadium Tolerance of Commercial FCC Catalyst

| | Commercial REY Catalyst | LAAP Coated REY Catalyst | Commercial REY Catalyst | LAAP Coated REY Catalyst |
|---|---|---|---|---|
| Example Number | 10 | 11 | 12 | 13 |
| V Content, ppm | 0 | 0 | 5000 | 5000 |
| Conversion, % vol. | 70.3 | 71.6 | 30.8 | 37.0 |
| Product Yields | | | | |
| $C_5+$ Gasoline, % vol | 55.6 | 55.6 | 25.1 | 29.5 |
| Total $C_4$'s, % vol | 15.4 | 14.8 | 4.8 | 6.0 |
| Dry Gas, % wt | 7.8 | 8.6 | 3.5 | 4.4 |
| Coke, % wt | 4.5 | 5.5 | 3.0 | 3.1 |
| $H_2$, % wt | 0.07 | 0.08 | 0.25 | 0.30 |
| LFO, % wt | 25.0 | 24.9 | 39.6 | 38.7 |
| HFO, % wt | 7.5 | 6.2 | 30.1 | 25.4 |
| G + D, % wt | 70.5 | 70.5 | 60.4 | 63.3 |
| n—$C_4$, % vol | 1.8 | 1.6 | 0.4 | 0.5 |
| i—$C_4$, % vol | 7.4 | 7.6 | 1.5 | 2.0 |
| $C_4=$, % vol | 6.1 | 5.7 | 3.0 | 3.5 |
| $C_3$, % vol | 2.5 | 2.9 | 0.7 | 0.7 |
| $C_3=$, % vol | 6.9 | 7.3 | 2.4 | 3.2 |

Attrition Analyses of Vanadium Containing Base and LAAP Coated Catalysts

In order to demonstrate that the LAAP coating trapped a significant portion of the vanadium, the vanadium containing LAAP coated catalyst of Example 13 and the base catalyst of Example 12 were each evaluated in our standard FCC catalyst attrition test as previously described. Following the attrition test, both the fines generated during the procedure and the remaining unattrited product were chemically analyzed. The results, summarized in Table 4, clearly show that the vanadium was concentrated in the LAAP coating which attrited off the base catalyst particle. The fines generated from the LAAP coated catalyst contained 2.0 wt. % vanadium compared with only 0.6 wt. % vanadium for the fines from the uncoated base catalyst. Assuming that the non-LAAP portion of the fines generated from the LAAP coated catalyst also contains 0.6 wt. % vanadium, the vanadium content of the LAAP fines is approximately 5.6 wt. %. These data suggest that if the LAAP coating were increased to around 10 wt. % that the majority of the vanadium could be trapped on the catalyst surface.

TABLE 4

Attrition Analyses of Vanadium Containing Base and LAAP Coated FCC Catalysts

| Example Number | 12 | 13 |
|---|---|---|
| Passivator Coating | None | LAAP |
| Wt. Percent Coating | — | 2.8 |
| Thimble Fines (Attrited Product) | | |
| Wt. Percent of Catalyst Charged | 3.5 | 5.4 |
| Wt. Percent of Passivator Coating | — | 28 |
| Wt. Percent Vanadium | 0.6 | 2.0 |
| "U" Tube Product | | |
| Wt. Percent Passivator Coating | — | 1.4 |
| Wt. Percent of Initial Coating Retained | — | 50 |
| Wt. Percent Vanadium | 0.44 | 0.36 |

What is claimed is:

1. A catalyst for catalytic cracking comprising: discrete particles of a catalytic cracking catalyst; and a coating on the surface of said particles; wherein the surface coating comprises at least one component in an amount that is effective to trap metals present in a feed subjected to said catalytic cracking; and wherein the coating has a coating attrition index between 0.1 and 100.

2. The composition of claim 1, wherein the coating has a coating attrition index between 0.5 and 75.

3. The composition of claim 1, wherein the coating has a coating attrition index between 1 and 50.

4. The composite of claim 1, wherein the surface coating is a refractory X-ray amorphous porous material.

5. The composite of claim 4, wherein the refractory porous material comprises rare earth oxide, aluminum oxide and aluminum phosphate.

6. The composite of claim 5, wherein the refractory porous material comprises rare earth oxide, aluminum oxide and aluminum phosphate present in the material in a weight ratio of from about 10:20:70 to about 90:5:5.

7. The composite of claim 5, wherein said rare earth is selected from the group consisting of metals having an atomic number of 57 through 71.

8. The composite of claim 5, wherein said rare earth is La, Ce, pr, Nd, Sm, Eu, Gd, Tb, Dy, Ho, Er, Tm, Yb, Lu, or a mixture thereof.

9. The composite of claim 5, wherein said rare earth comprises lanthanum.

10. The composite of claim 1, wherein said surface coating includes oxides of elements from one or more of the following: Group IIA, IIIA, IVA, IIIB, Si, Ge, Sn, Pb, P, Sb, Bi and Te.

11. The composite of claim 1, wherein the surface coating is effective to trap feed components containing elements selected from the group consisting of vanadium, copper, nickel, iron and sodium.

12. The composite of claim 1, wherein the catalyst comprises a large pore crystalline molecular sieve.

13. The catalyst of claim 12, wherein the large pore crystalline molecular sieve is a zeolite.

14. The catalyst of claim 1, wherein the catalyst is in the form of microspheroidal fluid cracking catalyst particles.

15. A method for preparing a cracking catalyst that comprises a surface coating that passivates deleterious metals in a feedstock, the method comprising the step of binding an attriting coating to the catalyst so that the coating continuously attrits off the catalyst, and continuously exposes new sites o the coating to the feedstock.

16. The method of claim 15, wherein the coating is bound to the catalyst by spray coating.

17. The method of claim 15, wherein the coating has a coating attrition index between 0.1 and 100.

18. The method of claim 15, wherein the coating has a coating attrition index between 0.5 and 75.

19. The method of claim 15, wherein the coating has a coating attrition index between 1 and 50.

20. The method of claim 15, wherein the surface coating is a refractory X-ray amorphous porous material.

21. The method of claim 20, wherein the refractory porous material comprises rare earth oxide, aluminum oxide and aluminum phosphate.

22. The method of claim 21, wherein the refractory porous material comprises rare earth oxide, aluminum oxide and aluminum phosphate present in the material in a weight ratio of from about 10:20:70 to about 90:5:5.

23. The method of claim 21, wherein said rare earth is selected from the group consisting of metals having an atomic number of 57 through 71.

24. The method of claim 21, wherein said rare earth is La, Ce, pr, Nd, Sm, Eu, Gd, Tb, Dy, Ho, Er, Tm, Yb, Lu, or a mixture thereof.

25. The method of claim 21, wherein said rare earth comprises lanthanum.

26. The method of claim 15, wherein said surface coating includes oxides of elements from one or more of the following: Group IIA, IIIA, IVA, IIIB, Si, Ge, Sn, Pb, P, Sb, Bi and Te.

27. The method of claim 15, wherein the surface coating is effective to trap feed components containing elements selected from the group consisting of vanadium, copper, nickel, iron and sodium.

28. The method of claim 15, wherein the catalyst comprises a large pore crystalline molecular sieve.

29. The method of claim 28, wherein the large pore molecular sieve is a zeolite.

30. The method of claim 15, wherein the catalyst is in the form of microspheroidal fluid cracking catalyst particles.

31. The method of claim 15, wherein the catalyst is in the form of spherical beads for moving bed catalytic cracking.

* * * * *